INVENTOR.
HARVARD H. GORRIE
BY
Raymond D. Junkins
ATTORNEY

May 5, 1959
H. H. GORRIE
2,884,940
FLUID PRESSURE TRANSMITTER
Filed May 8, 1953
3 Sheets-Sheet 3
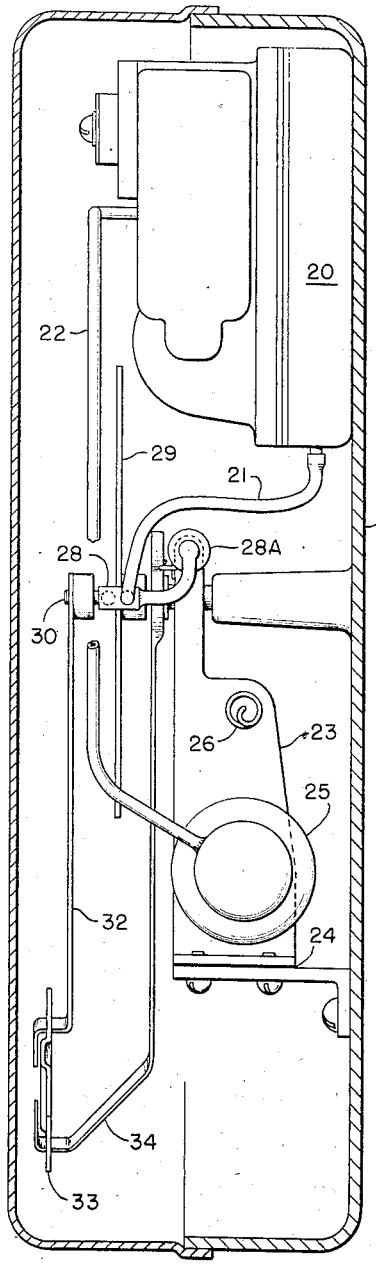
FIG. 3
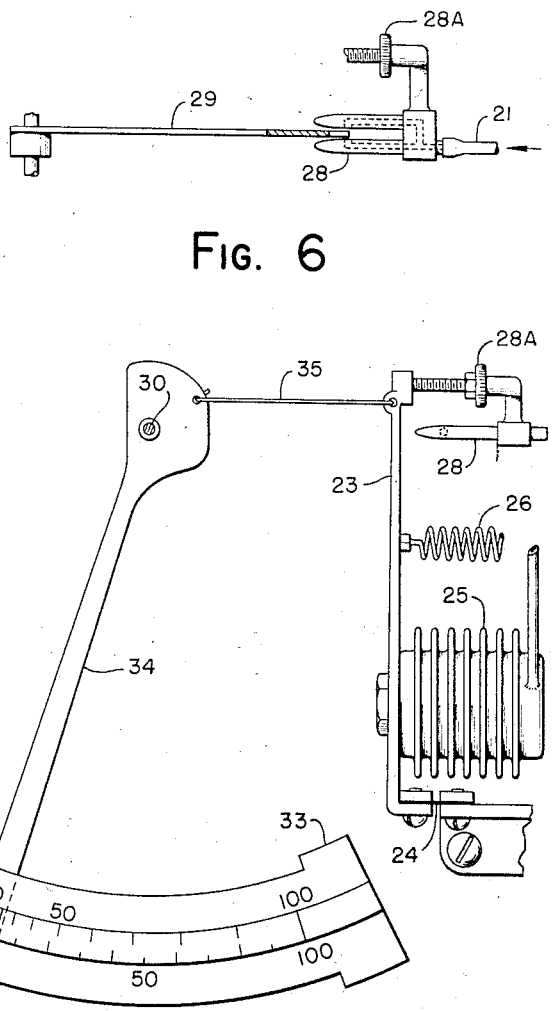
FIG. 6
FIG. 4
INVENTOR.
HARVARD H. GORRIE
BY
Raymond D. Junkins
ATTORNEY United States Patent Office 2,884,940
Patented May 5, 1959

2,884,940

FLUID PRESSURE TRANSMITTER

Harvard H. Gorrie, Cleveland Heights, Ohio, assignor to Bailey Meter Company, a corporation of Delaware Application May 8, 1953, Serial No. 353,829

4 Claims. (Cl. 137—85)

The present invention is directed toward mechanisms for producing a linear variation of an effect representative of a non-linear variable. An immediate application for the invention has been found in the need for a linear variation of a manifestation which is representative of the variations in the flow rate of a fluid.

The instrument and control industry has long utilized primary elements to restrict the flow of fluids in closed conduits in order to provide two pressures whose difference is indicated an/or recorded as the rate of flow of the fluids. Additionally it is desirable to be able to utilize the manifestation of the rate of flow as a factor in the control of the fluid flow or a related flow or condition. However, compensation must be made for the well-known fact that the difference in pressures provided by these primary elements varies as the square of the flow of fluids through them.

It is relatively simple to place a mercury manometer across the primary element and take the vertical position of a float on the mercury in one of the manometer legs as representative of the value of the head. Also there are differential bellows mechanisms which are adapted to respond to the head with a mechanical motion. These mechanical positions and motions may be transmitted directly, through linkage, to indicating and/or recording devices. As for control effects, fluid pressure valves and relays may be actuated by the mechanical motions and positions to establish fluid pressures which are proportional to the head. However, these head values are non-linear with respect to the flow they repreesnt, and for both observation and control purposes this manifestation is unsatisfactory.

One device, long used to deliver a linear manifestation of flow from the differential pressures, is arranged so that one of the pressures from the primary element is placed under an inverted bell which is shaped in its interior so it will be vertically displaced in position linearly with respect to flow. Another way of expressing this function is to state that the bell is shaped to extract the square root of head.

Function-extracting shapes for bells involve machine operations of a highly exacting nature. Consequently, the manufacturing cost, as well as time, has militated against production of these devices. Another disadvantage of these structures, for characterizing non-linear impulses, is that once formed, the function is fixed in the characterization it can accomplish.

Flexibility is introduced in this art of obtaining linear impulses with respect to a variable by taking the non-linear motion proportional thereto into a relay which has independent means for varying the transduction of the non-linear motion into linear impulses, commonly expressed in fluid pressures. The various types of relay mechanisms which perform characterizing functions are legion. The present invention is directed to a type of these relays termed "position-balance" mechanisms which take a non-linear impulse proportional to a variable and convert it to a series of linear fluid pressures proportional to the variable.

It will serve no immediate purpose to particularly define position-balance relays, as a class, in comparison with force-balance relays. It is sufficient to recognize in these mechanisms a first half of a fluid pressure couple positioned directly with a motion which is dependent on a variable and a central, main beam member which carries the second half of the fluid pressure couple in cooperation with the first half to produce a pressure which is imposed on a pressure responsive member which moves the beam against a spring having a constant rate. The pressure in the pressure responsive member is then established as the output fluid pressure dependent on the motion given the first half of the fluid pressure couple. With half of the couple given a predetermined shape, a tranduction may be given the non-linear motion dependent on the variable into linear fluid pressure impulses proportional to the variable. A specific structure with which to perform this function will be disclosed as embodying the present invention.

It will now be appreciated that the present invention has, as a primary objective, the provision of a device for establishing output impulses which have a predetermined relation of variation with input impulses.

It will be further appreciated that the present invention has as an object the provision of a device for establishing impulses which vary linearly with the flow of fluids.

An additional object of the invention is to perform the desired function with a mechanism whose components are comparatively easy to produce on a quantity basis and whose cost compares favorably with the prior and presently available structures.

Another object is to offer a mechanism which is compact, inherently stable in performance and easy to calibrate.

In the drawings:

Fig. 3 is a sectioned side elevation of the mechanism of Fig. 2.

Fig. 4 is directed to details of a portion of the mechanism of Fig. 2.

Figures 1, 5:
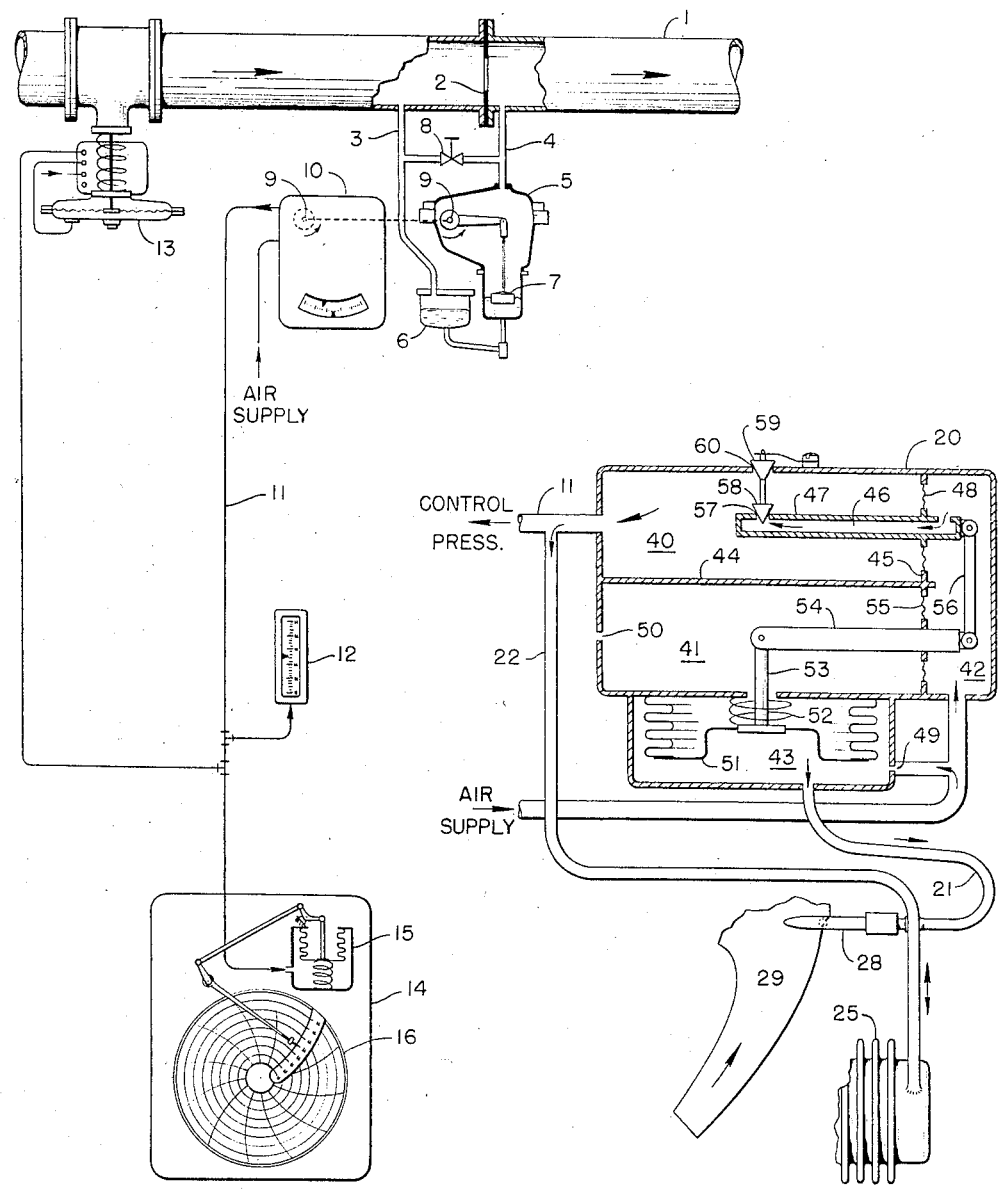
Fig. 1 is of a measuring system for flow in a closed conduit utilizing the present invention to give a linear manifestation.
Figure 2:
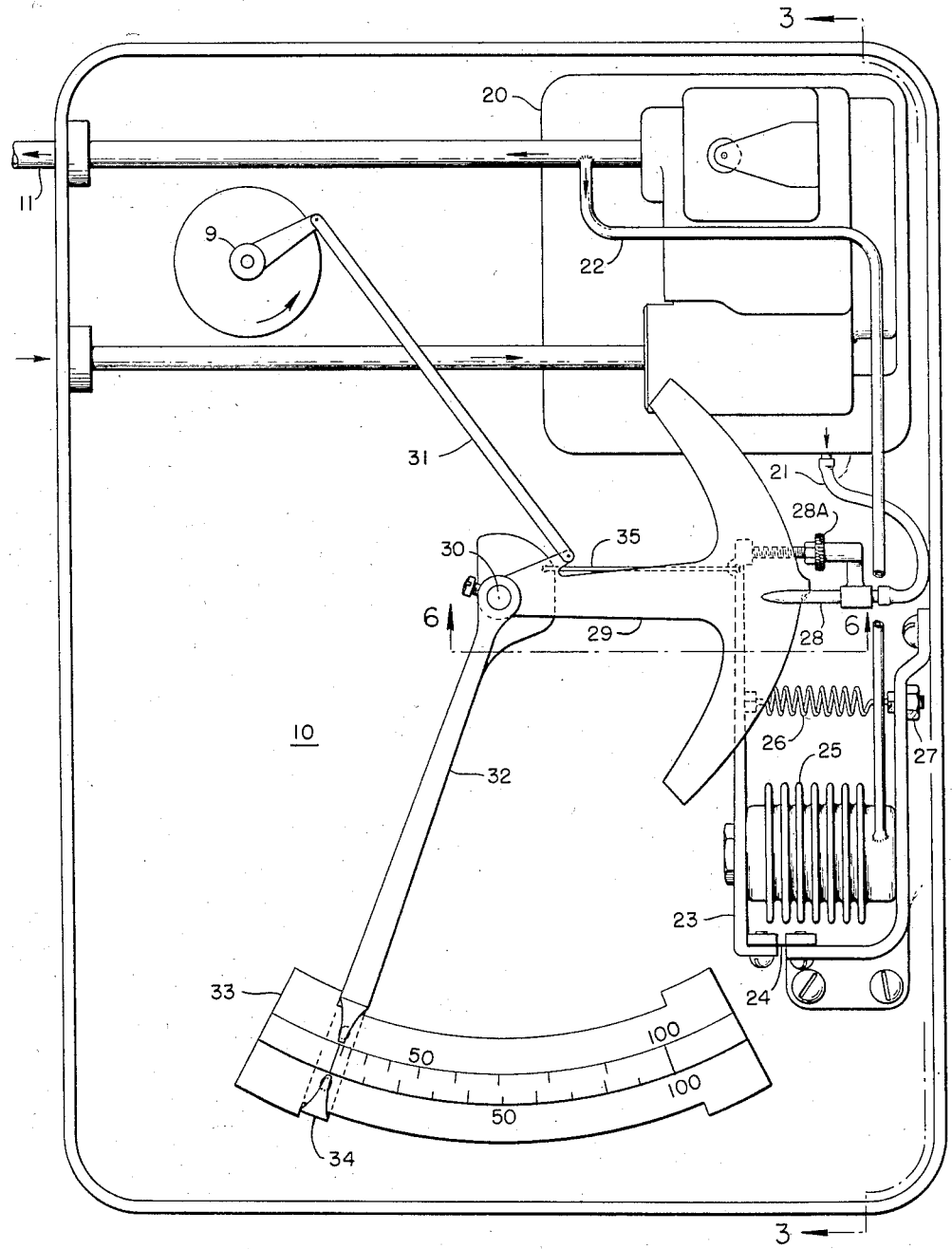
Fig. 2 is an elevation of the mechanism of Fig. 1 in which the invention is centered.

Fig. 5 discloses a detail of the mechanism of Fig. 2.

Fig. 6 is a view of a detail of the mechanism of Fig. 2.

Referring now to Fig. 1, conduit 1 is disclosed as containing a fluid flowing in the direction shown by arrows. For the restrictive function indicated in the introductory remarks, orifice plate 2 is installed in fluid conduit 1. Taps 3 and 4 are then placed so that the pressures have a differential which is proportional to the square of the flow of fluid in conduit 1.

These pressure taps 3 and 4 are imposed upon a mercury manometer comprised of a casing 5 connected with a reservoir chamber 6. A float 7 rides on the surface of the mercury and will position vertically as the mercury level varies with the differential between the pressure in taps 3 and 4. For calibration purposes, a valve 8 is provided through which to equalize the pressure in taps 3 and 4, and when this valve is open the levels of mercury in casing 5 and reservoir 6 will equalize. Float 7, as it rides on the surface of the mercury in casing 5, is connected by linkage to spindle 9 which transmits the flow motion to linkage external of the casing 5.

For purposes of clarity, the structure embodying the invention, generally indicated at 10, has been disclosed as removed from, and to one side of, casing 5. As a practical matter, spindle 9 will project from casing 5 directly into 10, attached thereto. The direction of rotation of spindle 9, upon increase of flow in pipe 1, has been indicated by arrows.

The structure at 10 is to be subsequently disclosed in detail. For a present application of the operation of the system, it is to be noted that the output fluid pressure of 10 is conducted with pipe 11 to remotely located indicator 12 and/or control valve 13 and/or recorder 14. The mechanism that may be found in a receiving recorder 14 has been diagrammatically illustrated as a pressure responsive bellows-spring combination 15 actuating an indicating and/or recording pen over chart 16.

It is now possible to appreciate that with a differential pressure between taps 3 and 4 established for different flow rates in pipe 1, the differential, or head, motion will have to be transduced into fluid pressures in pipe 11 which are linear with respect to the flow rates for actuation of indicating and/or recording mechanism over linear scales and charts.

With the head motion of float 7 varying in a non-linear relation to the flow fluctuation in pipe 1, the transmitted fluid pressure in 11 is established by modifying the motion of 7 by the novel structure at 10. If the mechanism of 10, has a characterizing transducer, it can be made to establish any one of a desired series of relationships between motions at spindle 9 and variation of pressures in pipe 11, the invention will be appreciated as far more flexible than the specific application disclosed at Fig. 1.

Turning now to Fig. 2, an elevation view has been utilized to fully disclose the structural components at 10. The cover, shown in Fig. 1, has been removed, and spindle 9 is shown more clearly as it projects into the case from the rear with a counter-clockwise rotation upon increase of flow in pipe 1.

The output fluid pressure pipe 11 extends horizontally across the top of the case. The air supply pipe, legended in Fig. 1, is parallel to pipe 11 and is shown below the spindle 9. The two pipes, one for the output fluid pressure and the other for the air supply, originate and terminate at a relay 20. This relay 20 will be disclosed in more detail in a subsequent figure. For the present purposes, this relay is to be regarded as functioning to produce a large deviation in output fluid pressure, opposite in magnitude from the input fluid pressure. Normally, a certain fluid pressure is held in pipe 21. When the value of this fluid pressure changes a small amount there is a large change in the deviation of the pressures in output pipe 11, and bellows pipe 22. The output change is so rapid that relay 20 is practically an on-off type of device.

Leaving relay 20 for the moment, attention should be directed to beam member 23. This beam is provided with a hinge-pivot at 24 which enables it to rotate clockwise (hereinafter designated C.W.) or counter-clockwise (hereinafter designated C.C.W.) as shown in Fig. 2. It is this single main beam 23 about which centers the function of the novel structure of the invention.

Although main beam 23 is partially shown in hidden lies in Fig. 2, it can be easily discerned how a bellows 25 and a spring 26 exert their forces at spaced distances thereon from pivot 24. Obviously spring 26 is by reason of it connection between pivoted beam 23 and a fixed abutment arranged to resist movement of beam 23 as bellows 25 acting against said fixed abutment tries to move the beam 23 C.C.W. about pivot 24. If the variations of pressure within bellows 25 are to be linear over a particular range of spring 26, the spring rate will have to be constant over the range as the balance of the two torques on beam 23 is maintained. Adjusting nut 27 is provided for spring 26 in order to make the necessary adjustments during calibration of the device.

Output pressures established by relay 20 are taken into bellows 25. As indicated supra, the output pressures in pipes 11 and 22 are controlled by, and are a magnification of, pressures in pipe 21. A pneumatic couple is formed to regulate the pressure in pipe 21. Half of this pneumatic couple is formed by a nozzle form at 28 and the other half is a cam plate-baffle 29, positioned by spindle 9.

Basically the function desired is accomplished by the nozzle form 28 and cam-baffle 29 being cooperated to establish a pressure in pipe 21 for control of relay 20 in establishing an output pressure in pipes 11 and 22 as well as bellows 25 which will move the beam 23 C.C.W. against the resistance of spring 26 until the two forces on beam 23 are balanced. It is to be noted that with cam 29 pivoted on a shaft at 30, C.C.W. rotation of cam 29 will move its edge surfaces, cooperating as a restricting baffle with nozzle form 28, away from 28 and cause the pressure in 22 to increase. The increased pressure in 22, expanding bellows 25, will force beam 23 to rotate C.C.W. about pivot 24 and carry nozzle form 28 toward the edge-baffle surfaces of cam 29 until their throttling action on the nozzle form builds up the pressure in 21 to hold a pressure in 22 and bellows 25, balanced against the force of spring 26 at the new position. Thus, for each new force established by the pneumatic couple of nozzle form 28 and cam 29 there is a new position established for beam 23. The resulting output pressure in pipes 11 and 22 will be linear with respect to the flow in conduit 1 if the opposing force of spring 26 is linear.

As spindle 9 rotates C.C.W. and rotates cam 29, C.C.W., through link 31, pointer arm 32 is also rotated C.C.W. to cooperate with scale 33. A pointer 34 is shown pivoted at 30, and in this Fig. 2 pointer 34 is directly behind cam pointer arm 32. A link 35 connects this pointer 34 and beam 23. Therefore, with spindle 9 rotated in accordance with head movement, movement of pointer 32 will be non-linear with respect to the flow rate over scale 33. However, the end of beam 23, attached to link 35, will be positioned in direct proportion to flow over its range of movement because of the shape given cam 29 and, consequently, pointer 34 will be positioned over scale 33 linearly with respect to the flow rate. As will be apparent from Fig. 2 the scale 33 is provided with an upper row or scale of non-linear graduations for co-operation with the pointer arm 32 and a lower row or scale of linear graduations for cooperation with the pointer 34. With this arrangement both pointers will indicate flow rate. The provision of the two pointers 32 and 34 movable over a common scale having graduations for each pointer is an important feature of the invention, particularly when it is utilized for control purposes as illustrated in Fig. 1. If both pointers do not indicate the flow rate, the operator is immediately aware of the fact that the transducing mechanism is not functioning properly and that the desired positioning of the valve 13 is not being achieved.

In Fig. 3, by an arbitrary section through Fig. 2, the more pertinent components of the mechanism of Fig. 2 have been exposed. The relay 20 is shown in its position at the top of the case, now supplied with a cover as in Fig. 1. Main beam 23 is now shown from an angle more illustrative of shape than that of Fig. 2, with spring 26 and bellows 25 positioned to exert their forces thereon a spaced distance from pivot 24. The disclosure is also very informative as to the shape given to the support for nozzle form 28 carried on the free end of beam 23. It can now be seen how cam 29 presents its baffle edge to the nozzle form 28. The multifarious elements carried on the shaft at pivot point 30 are more clearly seen in their relation to one another. Pointers 32 and 34 are spaced on the opposite sides of cam 29 as the pointers cooperate with scale 33. The pipe 22 is shown clearly, coming down from relay 20 to bellows 25. In order to show all of these components in their relationship to one another, in the clearest possible fashion, the section taken through Fig. 2 is not given a straight, or consistent, course but is allowed to deviate where necessary to exhibit each of these components to the best advantage.

Fig. 4 has been disclosed to specifically illustrate cooperation between pointer 34 and the free end of the beam 23 in the clearest possible manner. The elevation of Fig. 2 has been shown, with pointer 32 deleted, because it would obscure pointer 34. It can now be clearly seen how pointer 34 pivots about 30 when main beam 23 pivots about 24 and actuates pointer 34 through link 35. Main beam 23 is also shown without the necessity of the partially hidden-line disclosure of Fig. 2.

The structure of Fig. 5 has been generally disclosed and claimed in an application S.N. 289,402, filed May 22, 1952, by Harvard H. Gorrie and Jack F. Shannon, now Patent No. 2,737,963. There are some notable differences between that of the application and the present disclosure, although the over-all similaraties of the components of the structures are in close parallel. The most notable difference is that the bellows of the present Fig. 5 is enclosed in a chamber while this is not shown in the disclosure of the Gorrie et al. application. The nozzle-half of the pneumatic couple of the Gorrie et al. application was arranged to vary the internal pressure of the bellows while in the arrangement of Fig. 5 here nozzle form 28 varies the pressure in pipe 21 which is connected to the chamber external of the bellows. The present casing is divided into four main chambers 40, 41, 42 and 43. Chambers 40 and 41 are separated by a wall 44 while chamber 42 is separated from chambers 40 and 41 by a wall or partition generally indicated at 45. Air under the supplied pressure is available in chamber 42, in the passage 46 of a tubular arm 47 which is pivoted through a flexible diaphragm 48 and inserted in the wall 45, and chamber 43 through a fixed orifice 49. The orifice is sized to allow a flow to chamber 43 at a rate which is substantially constant under normal pressure conditions within the chamber 43.

The chamber 41 communicates freely with the atmosphere through aperture 50 and bellows 51 is loaded by a spring 52. The movable wall of the bellows is arranged to position a push-rod 53 in chamber 41 to angularly move an arm 54 about its pivot diaphragm 55 located in the wall 45 in alignment with the pivot sealing diaphragm 48. The other end of arm 54 is pivoted to a link 56 (in chamber 42) and the other end of link 56 is pivotally connected to an end of tubular arm 47. It will thus be seen that an upward movement of rod 53 will result in a C.W. movement of rod 54 about its pivot diaphragm 55, downward movement of link 56, and C.W. movement of tubular arm 47 about its pivot diaphragm 48; the angular movement of members 54 and 47 being substantially equal and the same direction. Downward movement of rod 53 results in C.C.W. movement of members 54 and 47.

Movement of arm 47 C.C.W. from the position shown in Fig. 5 results in the valve seat 57 moving away from valve 58 to admit air from chamber 42, into the interior of chamber 40. Movement of arm 47 upwardly from the position shown in Fig. 5 retains the valve 58 seated on 57 but lifts exhaust valve 59 from its seat 60 to allow air from chamber 40 to bleed to the atmosphere. Thus angular positioning of arm 47, about its pivot diaphragm 48, controls the supply of pressure air to chamber 40 and the bleed of air therefrom. A range of pressure in chamber 40 may vary from atmosphere pressure up to supply pressure.

The resultant, or output pressure of the relay 20 available in chamber 40, is imposed in the output pipe 11 and pipe 22 going to bellows 25.

The more detailed explanation of the function and limits of relay 20 are set forth in the application by Gorrie et al. It is important here to note only that the arrangement of this structure gives build-up of pressure in chamber 43 by cooperating cam 29 and nozzle form 28 which will cause an upward movement of push-rod 53 and tubular arm 47 to exhaust air from chamber 40 and lower the pressure in output pipe 11 and pipe 22 going to bellows 25. From an over-all stand-point, the present device of Fig. 5 acts in a direction opposite to that disclosed in the Gorrie et al. application by decreasing the output as the nozzle pressure increases. This is accomplished, fundamentally, by connecting the nozzle form to chamber 43 instead of chamber 41.

Fig. 6 offers a very illustrative cross section of Fig. 2 with which to disclose the nozzle form 28 as it cooperates with cam 29. It can be seen that the nozzle form is essentially comprised of two parallel pipes with holes arranged therein so that the air from the pipes are ejected toward each other, or in opposition. The air in pipe 21 comes into a manifold pressure passage which is common to both nozzle pipes. The edge of cam 29 slides between the two nozzle pipes to simultaneously throttle the opposed jets as a pneumatic couple and regulate the pressure build-up in nozzle pipe 21. An adjustable nut 28A is provided with which to change the relative positions of cam 29 and nozzle form 28 for purposes of calibration.

A final observation is in order with respect to the cam-baffle couple half 29, pivoted from 30. In Fig. 2 it may be noted that the cam has been developed symmetrically in both directions of rotation. A central, neutral position is formed between these two halves by an outwardly projecting portion to mark one end of the range of movement. As disclosed in Fig. 2 the linkage with spindle 9 is parallel and the lower half of the cam is utilized over the range of spindle 9 movement. If a C.W. movement of spindle 9 is available and parallel linkage is desirable, the upper half of cam 29 can be used by shifting it down, over the neutral section, to cooperate with the nozzle form 28.

The parallel linkage arrangement shown is highly desirable because of the convenience of introducing angularity between the rotation of spindle 9 and about pivot 30. The movement of the pointer 32 over the initial values can be enlarged to advantage in the calibration. It is this arrangement of a separate shaft for cam 29 with parallel linkage to spindle 9 which produces this result and enables the objectives of the invention to be achieved.

What I claim and desire to secure by Letters Patent of the United States is:

1. A transmitter of fluid pressures which vary over a linear range including, a shaft rotated non-linearly over the range of a variable, a cam plate baffle rotated from the shaft and having a non-linear variation of its radius, a fixed abutment, a beam pivoted at one end about a line parallel to the shaft, a bellows fixed by one end to the beam and acting against the abutment to urge the beam to pivot toward the edge of the cam plate in a plane parallel thereto, spring means connected with the beam and the abutment to oppose the bellows expansive force, a nozzle mounted on the beam and having opposed axially aligned discharge openings positioned on opposite sides of the cam plate baffle for cooperating with the cam edge to form a fluid pressure couple, a relay responsive to the nozzle pressure of the fluid pressure couple to establish an output fluid pressure signal, a device for controlling the value of the variable, and means for imposing the relay output pressure signal on the bellows and the device controlling the value of the variable.

2. The transmitter of claim 1 in which the nozzle is adjustably mounted on the beam by threaded means for adjusting the relative positions of the cam and nozzle.

3. The transmitter of claim 1 in which the cam plate baffle is developed symmetrically in each of its two directions of rotation and has an outwardly projecting portion providing a neutral position.

4. A transmitter of fluid pressures which vary over a linear range including, a shaft rotated non-linearly over the range of a variable, a cam plate baffle rotated from the shaft and having a non-linear variation of its radius.

a fixed abutment, a beam pivoted at one end about a line parallel to the shaft, a bellows fixed by one end to the beam and acting against the abutment to urge the beam to pivot toward the edge of the cam plate in a plane parallel thereto, spring means connected with the beam and the abutment to opposte the bellows expansive force, a nozzle mounted on the beam and having opposed axially aligned discharge openings positioned on opposite sides of the cam plate baffle for cooperating with the cam edge to form a fluid pressure couple, a relay responsive to the nozzle pressure of the fluid pressure couple to establish an output fluid pressure signal, a first pointer secured to the cam shaft for rotation therewith, a first non-linear arcuate scale of the values of the variable over which the first pointer moves, a second pointer mounted for rotation on the cam shaft, a link driving connection between the second pointer and the beam, and a second arcuate linear scale over which the second pointer moves.

References Cited in the file of this patent
UNITED STATES PATENTS

| | | |
|---|---|---|
| 2,093,254 | Spitzlass et al. | Sept. 14, 1937 |
| 2,244,564 | Mason et al. | June 3, 1941 |
| 2,330,654 | Ziebolz | Sept. 28, 1943 |
| 2,333,300 | Dickey et al. | Nov. 2, 1943 |
| 2,361,885 | Tate et al. | Oct. 31, 1944 |
| 2,387,075 | Johnson | Oct. 16, 1945 |
| 2,388,457 | Ziegler | Nov. 6, 1945 |
| 2,539,131 | Gundersen | Jan. 23, 1951 |
| 2,599,159 | Breedlove | June 3, 1952 |
| 2,638,874 | Woodhull | May 19, 1953 |
| 2,642,075 | White | June 16, 1953 |
| 2,651,941 | Windsor | Sept. 15, 1953 |
| 2,655,316 | Edwards | Oct. 13, 1953 |